United States Patent
Bischof et al.

(10) Patent No.: US 9,451,675 B2
(45) Date of Patent: Sep. 20, 2016

(54) CONFIGURATION OF OPERATING DEVICES FOR LIGHTING MEANS

(71) Applicant: TRIDONIC GmbH & Co. KG, Dornbirn (AT)

(72) Inventors: Gerold Bischof, Frastanz (AT); Anthony John Wood, Spennymoor (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 233 days.

(21) Appl. No.: 14/359,532

(22) PCT Filed: Nov. 21, 2012

(86) PCT No.: PCT/AT2012/000295
§ 371 (c)(1),
(2) Date: May 20, 2014

(87) PCT Pub. No.: WO2013/075154
PCT Pub. Date: May 30, 2013

(65) Prior Publication Data
US 2014/0327364 A1    Nov. 6, 2014

(30) Foreign Application Priority Data
Nov. 21, 2011    (DE) .......................... 10 2011 086 702

(51) Int. Cl.
*H05B 37/02*    (2006.01)
*H05B 33/08*    (2006.01)

(52) U.S. Cl.
CPC ...... *H05B 37/0209* (2013.01); *H05B 33/0863* (2013.01); *H05B 33/0872* (2013.01); *H05B37/0218* (2013.01); *H05B 37/0245* (2013.01); *H05B 37/0254* (2013.01); *H05B 37/0272* (2013.01)

(58) Field of Classification Search
CPC .......... H05B 33/0815; H05B 33/0803; H05B 33/0863; H05B 33/0869; H05B 33/0872; H05B 37/0254; H05B 37/0272; H05B 37/0245; H05B 37/0227; Y02B 20/202; Y02B 20/44; Y02B 20/46; Y02B 20/48; F21Y 2101/02; B60Q 1/124
USPC ........ 315/294, 297, 308, 312, 307; 362/227, 362/233, 543, 545
See application file for complete search history.

(56) References Cited

U.S. PATENT DOCUMENTS 8,442,403 B2 * 5/2013 Weaver ............. H05B 37/0272
362/231
8,901,850 B2 * 12/2014 Maxik ................ H05B 33/0872
315/297

(Continued)

FOREIGN PATENT DOCUMENTS

| DE | 102010003949 A1 | 10/2010 |
|---|---|---|
| DE | 102010038792 A1 | 2/2012 |
| EP | 1821582 A1 | 8/2007 |
| EP | 2169965 A1 | 3/2010 |
| GB | 2418482 A1 | 3/2006 |
| WO | 2009044330 A1 | 4/2009 |
| WO | 2010100576 A1 | 2/2010 |

*Primary Examiner* — Haissa Philogene
(74) *Attorney, Agent, or Firm* — Volpe and Koenig, P.C.

(57) ABSTRACT

The invention relates to a mobile device (10) for the configuration of at least one operating device (20) for operating a lighting means (22) and/or a luminaire, wherein the mobile device (10) comprises at least one optical sensor (12) provided for detecting technical lighting parameters, e.g. by way of device-internal image processing, and/or at least one localizing unit (110) provided for detecting absolute and/or relative position parameters of the mobile device, and wherein the mobile device (10) comprises an interface (11) for communication with the at least one operating device, and more particularly is designed to exchange configuration parameters with the operating device (20) via the interface (11) and, on the basis of the detected technical lighting parameters and/or position parameters, to alter at least one configuration parameter that influences the light rendering of the lighting means (22) in the operating device (20).

18 Claims, 5 Drawing Sheets

(56) References Cited

U.S. PATENT DOCUMENTS

| | | | |
|---|---|---|---|
| 8,918,118 B2 * | 12/2014 | Zudrell-Koch | H04L 29/12254 362/145 |
| 2009/0218951 A1 | 9/2009 | Weaver | |
| 2012/0050530 A1 * | 3/2012 | Raman | G06F 3/017 348/142 |
| 2013/0172012 A1 | 7/2013 | Zudrell-Koch | |
| 2014/0125590 A1 * | 5/2014 | Flagg | G06F 3/017 345/157 |

* cited by examiner

CONFIGURATION OF OPERATING DEVICES FOR LIGHTING MEANS

FIELD OF THE INVENTION

The invention relates to a device, a system and a method for the configuration of a light source. More particularly, the invention relates to a configuration of an operating device for a lighting means, which operating device is part of a luminaire.

BACKGROUND

DE 10 2010 003 949 A1 describes a system for adjusting an LED light source to at least one technical lighting parameter with a further light source. In this case, the system comprises an adjusting unit with a light sensor for detecting the at least one technical lighting parameter of a light source, and an interface for the wireless transmission or wired outputting of data reproducing the parameters. The system furthermore comprises an LED light source with a control unit designed to receive data from the interface of the adjusting unit via an interface of the LED light source and to store said data in a memory assigned to the light source.

EP 2 169 965 A1 discloses a system in which a color temperature of a surgical luminaire is adjustable with the aid of a control device. A camera is connected to an image processing device and the control device can adjust a color temperature parameter at the surgical luminaire if a deviation in the color temperature is ascertained. In this case, the camera is fixedly installed on the surgical luminaire.

WO 2012/100576 A1 discloses a system which allows goods to be ordered via a cellular phone. A luminaire is provided in the system, said luminaire changing the color depending on the order.

DE 10 2010 038 792 A1 discloses a method for allocating an operating address to an operating device—having bus capability—for lighting means, in which an absolute or relative position of the operating device is determined by a position device. The position is converted into an operating address and stored in the operating device.

DE 10 2205 029 728 A1 discloses an arrangement for controlling the intensity of street lighting, which comprises one or a plurality of locatable and individually identifiable mobile devices. Street lighting elements are controlled by means of a control device depending on the position and the identity of the mobile devices.

Finally, GB 2418482 A describes a method for replacing a network address of a lighting means, which uses a control unit for light control. The control unit changes systematically between different light levels or colors, such that the lighting means can be identified.

In commercially available light/lighting systems used e.g. at the workplace, an irradiance for example of a desk, a transport path or other objects is determined indirectly by means of a sensor fitted to the luminaire, for example. Color temperature values and a color combination are not detected. In particular, the light emitted by a light source, the radiance and a color combination are not analyzed with regard to physiological aspects, i.e. with regard to the effect of the emitted light on a human being.

This has the disadvantage, in particular, that in general the lighting situation, in particular the color temperature or the color spectrum of the light, cannot be adjusted to the individual perception of a person.

Furthermore, different surfaces with the same irradiation have different reflection properties which a person can perceive differently, e.g. as pleasant or unpleasant, for example depending on a time of day, a season, a location and/or a temperature.

Present-day light measuring systems operate according to the indirect principle, i.e. use is made of light regulation/control by means of the light reflected at a surface. By way of example, the color of a desk surface can greatly influence a person's perception since the reflected light is greatly dependent on the optical properties of the desk surface. In this regard, with the same adjustment for the luminaire, the operating device and/or the lighting means in the case of a dark desk surface, significantly less reflection may be ascertained, which a person perceives as pleasant, while with the same adjustment and a white desk surface an unpleasant reflection with high radiance is perceived. A similar situation holds true for matt and specularly reflective surfaces.

A further problem is posed by the assignment of a position to an address of the luminaire, of the operating device and/or of the lighting means, this often being problematic.

Therefore, the invention is based on the object of enabling user-defined regulation/control of a light source and of simplifying the addressing of the operating device and/or of the luminaire.

SUMMARY

The invention achieves the objects by means of devices, the system and the method according to the independent claims. Further advantageous embodiments of the invention are described in the dependent claims.

In a first aspect, the invention provides a mobile detection and configuration device for the configuration of at least one operating device for operating a lighting means. In this case, the mobile device comprises:

a. at least one optical sensor arranged for detecting technical lighting parameters, and/or
b. at least one localizing unit provided for detecting absolute and/or relative position parameters of the mobile device.

In this case, the mobile device comprises an interface for communication with the at least one operating device, and more particularly is designed, via the interface, to exchange configuration parameters with the operating device and, on the basis of the detected technical lighting parameters and/or position parameters, to alter at least one configuration parameter that influences the light rendering of the lighting means in the operating device.

The at least one optical sensor can be a light sensor, a color sensor, an image sensor and/or a camera. The optical sensor can be arranged to determine technical lighting parameters, such as e.g. brightness information, an irradiance of an object, a surface property of an object, a color temperature, a color and/or light temperature.

The at least one localizing unit can have an (e.g. barometric) altimeter, a GPS receiver and/or a compass and/or can be designed to receive radio signals and/or light signals.

The mobile device can be arranged to read out and store at least one configuration parameter and more particularly an identifier from the operating device and/or the luminaire, for example by means of the emitted light.

The mobile device can be arranged to automatically identify an operating device by means of an identifier and to communicate predetermined configuration parameters to the operating device and/or the luminaire.

The mobile device is configured to read out and store position data from the operating device and/or the luminaire. The mobile device can furthermore be configured to communicate predetermined configuration parameters to the operating device and/or the luminaire automatically and/or in response to a user interaction, if the mobile device is situated e.g. at a specific distance from the operating device.

The mobile device can furthermore comprise a user interface, which is designed for altering configuration parameters, more particularly depending on the detected technical lighting parameters and/or the position parameters, in response to a user interaction. The mobile device can also be designed to transmit the altered configuration parameters to the operating device.

The mobile device can be configured to determine a position from the position parameters and to communicate it to the operating device.

The mobile device can be configured to select, automatically and/or in response to a user interaction, a configuration parameter set for the operation of the lighting means from at least one configuration parameter set having at least one configuration parameter which can be saved in the operating device and/or the luminaire and/or can be stored in the operating device and/or the luminaire.

The mobile device can be configured to indicate the at least one configuration parameter set saved in the operating device and/or the luminaire and/or stored in the operating device and/or the luminaire, e.g. in accordance with a sorting, more particularly according to a frequency of the choice of the at least one configuration parameter set.

The interfaces can be designed for wireless and/or wired communication.

The mobile device can comprise a communication interface and can be designed to receive data, e.g. temperature and/or time information, from an external memory via the communication interface and thereupon, automatically and/or in response to a user interaction, to communicate configuration parameters via the interface for communication with the operating device. The mobile device can also be designed to transmit configuration parameters and/or a configuration parameter set to an external memory via the communication interface.

The mobile device can be configured to receive data for representing the user interface and/or parts thereof, data for carrying out the image processing, at least one operating device identifier and/or position data for at least one operating device and/or a luminaire via the communication interface.

The mobile device can be a mobile communication terminal, e.g. a cellphone (cellular phone) or smartphone.

In a further aspect, the invention provides an operating device for operating a lighting means, wherein the operating device comprises an interface for communication with at least one mobile device, and wherein the operating device more particularly is designed, via the interface, to exchange configuration parameters with the mobile device, to store a position communicated by the mobile device and/or at least one configuration parameter communicated by the mobile device, and to alter at least one configuration parameter that influences the light rendering of the lighting means depending on the at least one communicated configuration parameter.

The operating device can be designed to store a configuration parameter set having at least one configuration parameter, e.g. having a frequency of the choice of the configuration parameter set, and/or to communicate at least one configuration identifier for the configuration parameter set to the mobile device.

The mobile device or the operating device can be designed to determine its position on the basis of received radio and/or light signals and to communicate the position to the operating device or the mobile device.

In yet another aspect, the invention provides a luminaire comprising an operating device such as is described above.

In yet another aspect, the invention provides a configuration system comprising at least one operating device for operating a lighting means and/or a luminaire, and at least one mobile device for the configuration of the at least one operating device and/or the luminaire, wherein the mobile device comprises at least one optical sensor provided for detecting technical lighting parameters, e.g. by way of device-internal image processing, and/or at least one localizing unit provided for detecting absolute and/or relative position parameters of the mobile device, wherein the operating device and/or the luminaire and the mobile device in each case comprise an interface designed in each case to exchange configuration parameters between the operating device and/or the luminaire and the mobile device, and wherein the mobile device more particularly is designed, via the interface, on the basis of the detected technical lighting parameters and/or position parameters, to alter at least one configuration parameter that influences the light rendering of the lighting means in the operating device and/or the luminaire.

In yet another aspect, the invention provides a method for the configuration of an operating device for operating a lighting means and/or a luminaire, wherein a mobile device, by means of at least one optical sensor, detects technical lighting parameters, e.g. by way of device-internal image processing, and/or detects absolute and/or relative position parameters of the mobile device by means of at least one localizing unit, and wherein the mobile device and the operating device and/or the luminaire exchange configuration parameters via a respective interface, wherein the mobile device, more particularly via the interface, on the basis of the detected technical lighting parameters and/or position parameters, alters at least one configuration parameter that influences the light rendering of the lighting means in the operating device and/or the luminaire.

Further aspects of the invention are also described below with reference to the accompanying drawings.

DETAILED DESCRIPTION OF THE PREFERRED EMBODIMENTS

Figure 1:
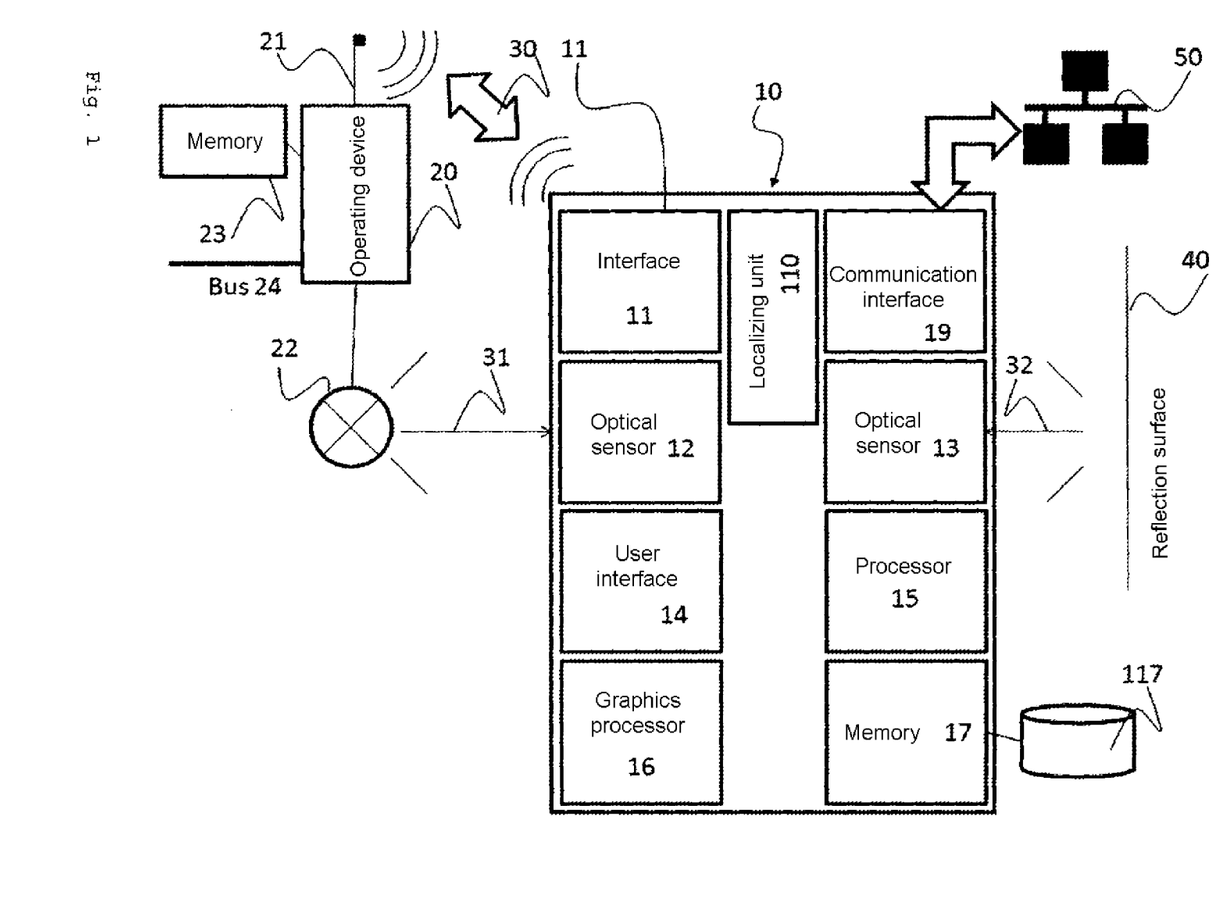
FIG. 1 shows a schematic overview of the overall system.

According to the invention as shown in FIG. 1, the light from an artificial light source as lighting means 22 is now detected directly, i.e. in a visual link with the light exit of the lighting means 22, by means of a mobile device 10, as a result of which it is ensured that ambient influences can be determined and taken into account better than in the case of a measurement according to the indirect principle.

The system described thus enables energy-efficient light control/regulation which also makes it possible to carry out light control/regulation according to physiological criteria.

Moreover, the mobile device 10 allows operating devices and/or luminaires to be put into operation in a simplified manner.

This makes it possible, for example, depending on the season, to admix a greater or lesser proportion of blue with the light spectrum of the emitted light, in order to increase a user's wellbeing. According to the invention, the light control/regulation is preferably realized by alteration of configuration parameters in a control unit of a luminaire and/or an operating device 20 for a lighting means/light source and/or by transmission 30 of at least one configuration parameter set having at least one configuration parameter. The terms control unit and operating device 20 are used synonymously hereinafter. Furthermore, an operating device 20 can more particularly be arranged in a luminaire and operate a lighting means/light source 22.

The mobile device 10 according to the invention comprises at least one optical sensor 12 (for example at least one camera and/or one light sensor). In particular, the mobile device 10 comprises two optical sensors 12, 13, which are arranged on different sides of the mobile device. By means of the first and second optical sensors 12, 13 arranged on the mobile device 10, at least one technical lighting parameter 31 of a light source can be detected and/or measured by the mobile device 10.

The mobile device 10 furthermore comprises an interface 11, in particular a wireless return channel, by means of which the mobile device 10 can communicate with the control unit, e.g. the operating device 20 for a lighting means (the light source) 22, from which at least one technical lighting parameter 31 was detected.

A user can alter or adjust at least one technical lighting parameter 31 via a user interface 14 on the mobile device 10, for example via a regulator represented on a touch-sensitive input field (touch-screen). The desired adjustments are then transmitted preferably wirelessly to the operating device 20 or an interface thereof.

Figure 2:
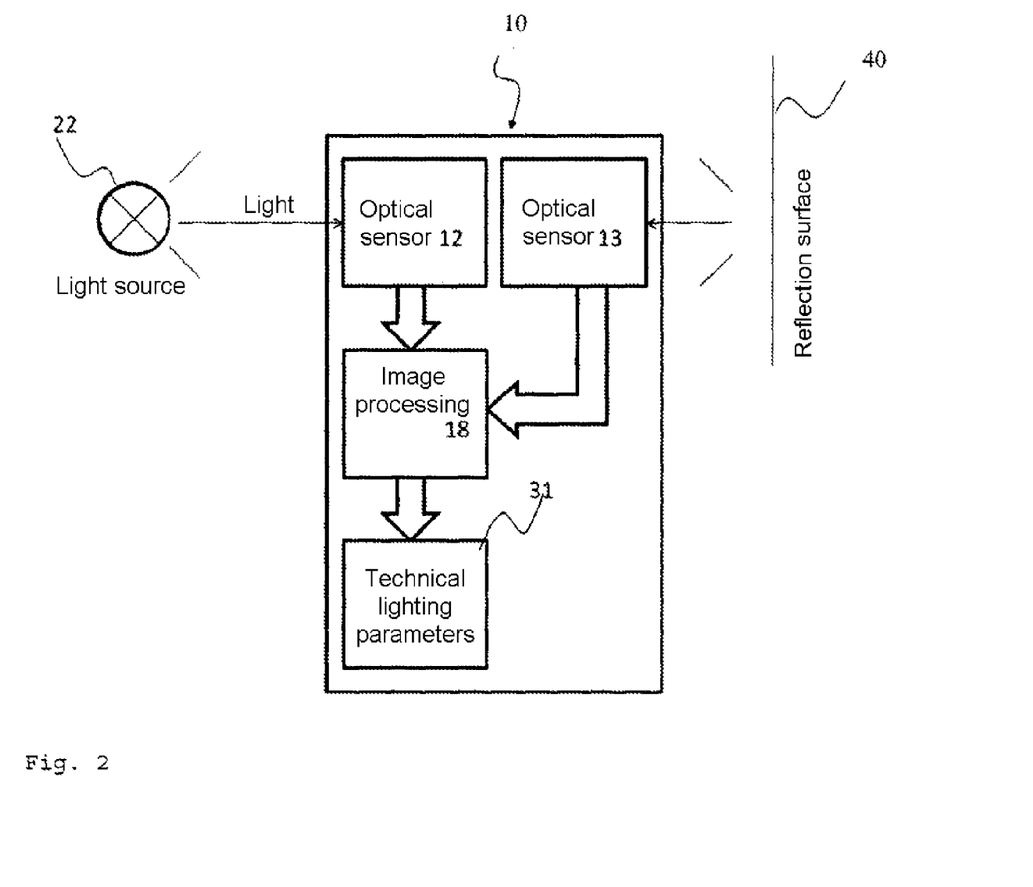
FIG. 2 shows by way of example one possibility for the determination of technical lighting parameters.

For the determination of the at least one technical lighting parameter 31, image processing can be carried out in the mobile device 10, said image processing making use of, for example, a processor 15 provided in the mobile device 10, a graphics processor 16 and/or a memory 17. By means of the image processing 18, technical lighting parameters 31 can be extracted and/or calculated for example from an image captured by a camera (as optical sensor). This is shown schematically in FIG. 2, which shows by way of example one possibility for the determination of at least one technical lighting parameter with image processing 18. In this case, information received by the first optical sensor 12 and (additionally or alternatively) by the second optical sensor 13 can be processed in order to determine or calculate the technical lighting parameter 31 or a further (technical lighting) parameter. By way of example, this involves a cellular phone (smartphone) having a camera on the front side, whereby this first camera forms the first optical sensor 12, and also a second camera, which forms the second optical sensor 13. The image captured by the camera can also comprise the evaluation of one or more images of a video recorded by the camera. An optical sensor 12, 13 can, of course, also be configured to determine a technical lighting parameter directly, i.e. without image processing 18, e.g. as a light sensor which directly outputs a brightness value. By way of example, it is thus possible to determine a brightness value, a light color, a color temperature, color components of the light spectrum of the emitted light and/or other light features.

Once again with regard to FIG. 1, it is possible, more particularly by means of optical sensors 12, 13 fitted on different sides of the mobile device 10, to detect simultaneously the light emitted by the light source 22 (by means of a first optical sensor 12) and a light reflected by an object 40 (by means of a second optical sensor 13). In this regard, it is possible, for example, by means of the first optical sensor 12, to analyze light emitted by a ceiling lamp and, by means of the second optical sensor 13 situated opposite, to pick up and analyze the light emitted and/or reflected by an object 40, e.g. a desktop, and if appropriate also to determine therefrom a technical lighting parameter 32 and/or to alter a technical lighting parameter already determined (as is also explained in the case of the example in FIG. 4).

On the basis of the technical lighting parameters 31, 32 determined, a configuration for the operating device 20 can then be proposed to the user, for example, which configuration then either is communicated 30 in the form of configuration parameters to the operating device 20 for the lighting means or can be altered by the user beforehand via the user interface 14.

An optical sensor 12, 13 can also be provided for picking up surface information of an object 40. A parameter can then be determined from the surface information picked up and can be compared for example with data in a table and/or database 117. Such a comparison can, of course, also be carried out for technical lighting parameters 31, 32 determined.

The configuration of the operating device 20 or of the control unit can then be influenced or altered on the basis of information resulting from a comparison of the parameter with the table or database. In particular, with respect to a parameter it is thus possible to determine at least one configuration parameter which is used to alter the configuration of the operating device 20. The table/database 117 can preferably be kept available in the memory 17 in the mobile device 10 and be for example part of a configuration program that is executed on the mobile device, e.g. together with the image processing 18 and/or the user interface 14.

The mobile device 10 can also read out an identifier, for example a unique address predefined by the manufacturer or a randomly allocated address, from the operating device 20. Said identifier can then be stored for example together with a configuration for the operating device 20 in the mobile device 10.

The information transmission, i.e. the transmission 30 of the configuration parameters from and/or to the mobile device 10, and respectively the operating device 20, is preferably effected wirelessly, e.g. by means of infrared, visible light, Bluetooth, ANT, Zigbee, . . . . However, it can also be effected in a wired manner, e.g. by means of USB, Ethernet, etc., the mobile device 10 being connected to the operating device 20 or the interface 21 of the operating device 20. The wireless information transmission, i.e. the transmission 30 of the configuration parameters from the operating device 20 to the mobile device 10, can, in the case of a transmission by means of infrared or visible light, also be effected via the lighting means 22 and the interface 31 (that is to say the emitted light), wherein in this case the interface 21 of the operating device 20 for transmitting information to the mobile device 10 can be formed with that through the lighting means 22. In such a case, the operating device 20 can additionally furthermore have an interface 21 which can serve for receiving data/information transmitted by the mobile device 10 via the interface 11 thereof. The transmission 30 of the configuration parameters from the operating device 20 via the light source 22 to the mobile device 10 can, in the case of a transmission by means of infrared or visible light, be received by an optical sensor 12 or 13 of the mobile device 10.

In the case of a transmission 30 of the configuration parameters from the operating device 20 via the lighting means 22 to the mobile device 10, can, in the case of a transmission by means of infrared or visible light, the transmission 30 can be effected by a change of a technical lighting parameter 31, wherein said technical lighting parameter 31 is detected by an optical sensor 12 or 13 of the mobile device 10 and is evaluated internally in the mobile device 10 for example by means of the image processing 18. In this regard, it is possible, for example, that an identifier, for example a unique address predefined by the manufacturer or a randomly allocated address, is read out from the operating device 20 by the mobile device 10 by means of an optical sensor 12 or 13. In this regard, by way of example, the light emitted by the lighting means 22 can be recorded by the camera 1 or the camera 3 and can be evaluated by the mobile device 10, preferably by means of the image processing 18. It would be possible here for the operating device 20 to modulate the light emitted by the lighting means 22 in the infrared or visible range and, by means of this modulation, to transmit the configuration parameter, preferably the identifier, as information. The optical sensor 12 or 13, which is formed for example by the camera 1 or the camera 3, can record the light emitted by the lighting means 22. The sequence of the recorded images can be evaluated by the mobile device 10 directly, preferably by means of the image processing 18, or indirectly, by means of forwarding of the recorded images for evaluation on a central unit, wherein the configuration parameter, preferably identifier, can be identified and evaluated as a modulated signal.

In this way, it is possible for an identifier to be communicated from the operating device 20 via the lighting means 22 by a change of a technical lighting parameter to the mobile device 10, wherein the optical sensor 12 or 13 is used for receiving the identifier. As already mentioned, the identifier can be for example a unique address which is predefined by the manufacturer and which is stored in the operating device 20, preferably in the memory 23, by the manufacturer. The identifier can also be a randomly allocated address or an address predefined by a controller via the operating device bus 24. The address can be allocated for example in such a way that for example via the operating device bus 24 or else via the mobile device 10 via the transmission 30, the operating device 20 is requested to transmit its address as a configuration parameter. In the case of an address predefined by the manufacturer, this address can be output directly. If an address is not yet stored in the operating device 20, then the operating device 20 can for example independently determine an address by a random number or else can acquire an allocated address upon request from a central unit via the operating device bus 24. Subsequently, as already explained, the operating device 20 can change a technical lighting parameter of the light source 22 in such a way that this change can be detected and evaluated by the mobile device 10 by means of the optical sensor 12 or 13.

It is also possible that different configuration parameters, that is to say not just an identifier, but for example also general information for the user (price information in a supermarket, wherein for example each lighting means is assigned to a product, or advertising messages to the user) or status information, such as information about the previous operating duration of the operating device 20 or of the lighting means 22, information about the lighting means 22, such as, for example, the type or the power, or faults that have occurred in the operating device 20 or the lighting means 22, by means of a technical lighting parameter 31, are output by means of the lighting means 22 and are detected by the mobile device 10 by means of the optical sensors 12, 13. In principle, information transmission from the operating device 20 via the lighting means 22 to the mobile device 10 is possible by means of the change of a technical lighting parameter 31, wherein the mobile device 10 can use an optical sensor 12, 13 for receiving the transmitted information.

The change of a technical lighting parameter 31 for transmitting information can be effected for example by a modulation of the brightness of the lighting means 22 or by a repeated change of the color of the lighting means 22.

It is likewise possible that the mobile device 10 firstly communicates data to an external memory 50, for example via a communication interface 19, from which memory the configuration parameters are then transmitted to the operating device 20, or the control unit. Said external memory can also be a computer, for example a PC.

Furthermore, the identifier can firstly be read out from the operating device 20, or the control unit, in order to address the operating device 20, or to assign a position to the address provided by the manufacturer. The mobile device 10 can therefore comprise a localizing unit 110, for example an altimeter, GPS, a compass, an accelerator sensor, a radio receiver, and/or an infrared receiver, which serves to determine absolute and/or relative position data. One example of the determination of such position data is described in DE 10 2210 003 949 A1.

After the mobile device 10 has determined an absolute and/or relative position, it can transmit 30 this position to the operating device 20, which then stores the position and, if appropriate, communicates it to a central unit via an operating device bus 24.

By means of the identifier and/or the position of an operating device 20 for lighting means, the mobile device 10 can also automatically communicate predetermined configuration parameters to the operating device 20. This can be effected for example the if a user has already specified a configuration parameter set for a specific situation, time or position or generally has saved a configuration parameter set for the operating device 20.

If the mobile device 10 receives the identifier of the operating device 20, then it can automatically transmit the predetermined or saved at least one configuration parameter set having at least one configuration parameter to the operating device 20.

That can be done, as stated, also depending on the position. By way of example, a region around the position of the operating device 20 can be defined. Upon entry into this region, the mobile device 10 can communicate the corresponding configuration to the operating device 20. It is also possible, of course, for the mobile device 10 firstly to inform the user that at least one configuration parameter set which can be activated on the basis of an event (e.g. entry into the region) is present with respect to an operating device 20. When multiple configuration parameter sets are present, they can then be indicated to the user for selection. The user is then able to alter a proposed configuration parameter set, or to initiate the transmission to the operating device 20.

Provision can also be made for at least one configuration parameter set already to be saved in the operating device 20, e.g. in a memory 23, which is transmitted to the mobile device 10 if the latter enters into a region around the operating device 20.

This region can be defined e.g. by virtue of the fact that a position is stipulated for the operating device 20 and the operating device 20 is designed such that at least one configuration can be communicated actively to the mobile device 10 if the latter enters into the region around the operating device 20. Furthermore, the region around the operating device 20 can be defined by a range of a transmitter provided in the operating device 20 (e.g. a Bluetooth communication unit). If the mobile device 10 is in reception range, then the at least one configuration parameter set is transmitted. By means of the mobile device 10, said configuration parameter set can then be indicated to the user and, if appropriate, altered by said user.

If a plurality of configuration parameter sets are transmitted from the operating device 20 to the mobile device 10, then they can be represented for example in a sorted manner, wherein the sorting can be effected according to a frequency of configuration parameter set use. For this purpose, the operating device 20 can register (e.g. in the memory 23) how often a configuration in the form of a configuration parameter set having at least one configuration parameter is used and/or serves as a basis for a configuration change. For the user it is thereby easily possible for example to have recourse to configurations frequently used e.g. by other users and thus to arrive at an advantageous configuration more rapidly.

Furthermore, the mobile device 10 can receive data from an external memory 50, e.g. a network memory, via the communication interface 19. This data can be for example temperature and/or time information. It is also possible that from the external memory 50 configurations for one or a plurality of operating devices are transmitted to the mobile device 10. It is thereby possible, for example, to transmit configurations created by other users to the mobile device 10, to alter and/or to use this configuration and to transmit it to the operating device 20. The data can also be transmitted into the table/database 117 used e.g. for comparisons with technical lighting parameters 31, 32 (see above).

On the basis of the data supplied, for example the temperature and/or time information, the mobile device 10 can also propose configuration parameter changes to the user or communicate 30 them automatically to the operating device 20. For this purpose, the mobile device 10 can execute an evaluation program, which, depending on time information, for example, creates a configuration which is appropriate to a season and by which the light parameters of the light emitted by the lighting means are altered.

Via the communication interface 19 of the mobile device 10, it is furthermore likewise possible to transmit configurations created on the mobile device 10, and/or configurations determined by the operating device 20, to an external memory 50. In this regard, by way of example, an address of the operating device 20 provided by the manufacturer together with position data can also be transmitted to the external memory.

Via the communication interface 19, furthermore, parts of the user interface 14, or the user interface 14 itself, can be transmitted to the mobile device 10. In particular, the user interface 14, the configuration software and/or the image processing 18 implemented on the mobile device 10 can be altered and/or updated. The user interface 14 or parts thereof can be transmitted to the mobile device 10 for example in the form of application data ("apps").

In one embodiment, the mobile device 10 is a mobile communication terminal, e.g. a cellphone (cellular phone), a smartphone (as a specific form of a cellular phone), a tablet computer (PC), a laptop computer, etc.

The operating device 20 for operating the lighting means (light source 22) comprises an interface 21 corresponding to the interface in the mobile device 10. In particular, the operating device 20 receives configuration parameters via the interface 21 and stores them in the memory 23 provided in the operating device 20 and influences the light rendering of the lighting means depending on the received configuration parameters. In this case, the interface 21 is provided for transmitting configuration parameters from the operating device 20 to the mobile device 10.

The operating device 20 can more particularly store a number of configuration parameter sets having at least one configuration parameter and, for example, also the frequency with which a configuration parameter set is selected or used by a mobile device 10.

In particular, the operating device 20 is designed to store a position depending on the address predefined by the manufacturer.

In this case, the operating device 20 can be provided in a luminaire and comprise a bus interface for communication with a central unit, for example according to the DALI standard or the powerline standard. In this case, it is possible for the configuration parameters that alter the technical lighting parameters of the lighting means 22 or of the light source to be transmitted to the operating device 20 by means of a computer, e.g. a PC.

The invention likewise provides a configuration system which uses a mobile device 10 and an operating device such as have been described above.

Figure 3:
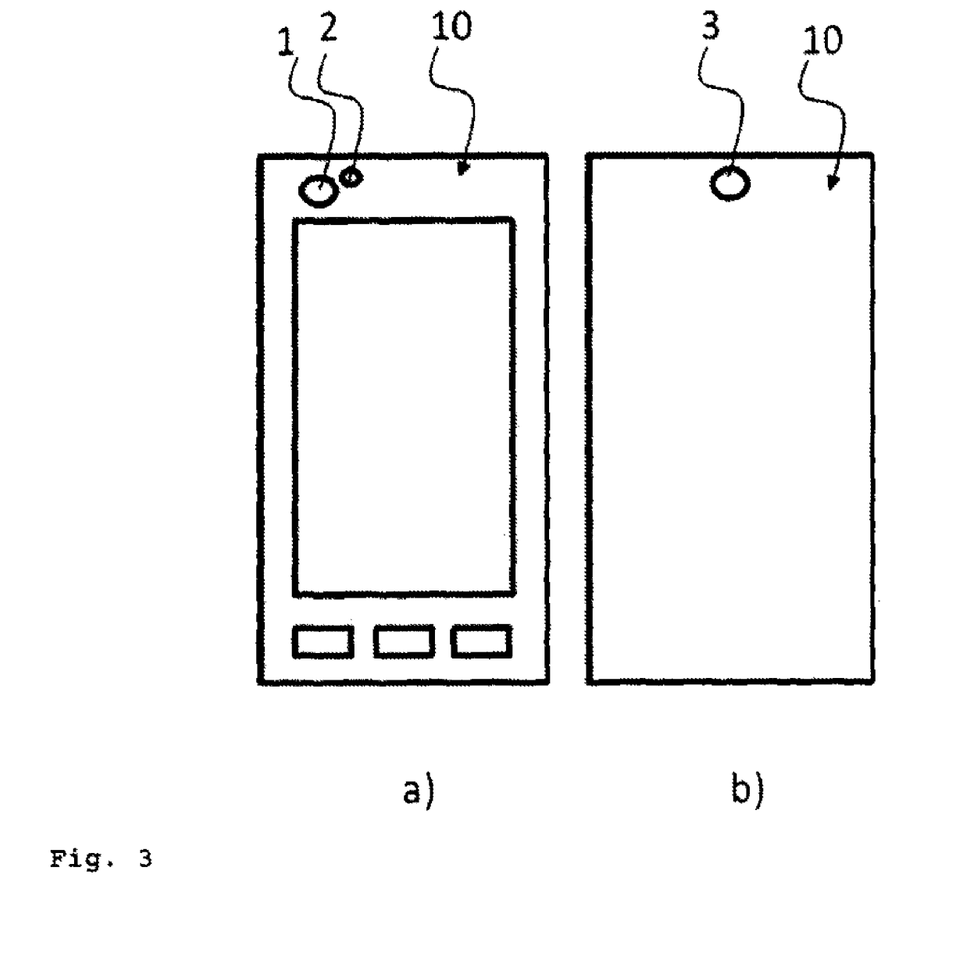
FIG. 3 schematically shows a mobile device.

FIG. 3 shows the mobile device 10 by way of example. In this case, FIG. 3a shows a front side of the mobile device 10, while FIG. 3b shows a rear side of the mobile device 10.

In the example illustrated, the mobile device 10 comprises a camera 1 and a light sensor 2 on the front side, while a camera 3 is arranged on the other side of the mobile device. This mobile device 10 illustrated in FIG. 3 shows by way of example how the mobile device 10 illustrated in FIG. 1 and FIG. 2 can appear outwardly. As already mentioned, the first optical sensor 12 can be formed by a camera 1, while the second optical sensor 13 can be formed by a light sensor 2. Alternatively, by way of example, the second optical sensor 13 could also be formed by a second camera on the rear side of the mobile device 10.

Figure 4:
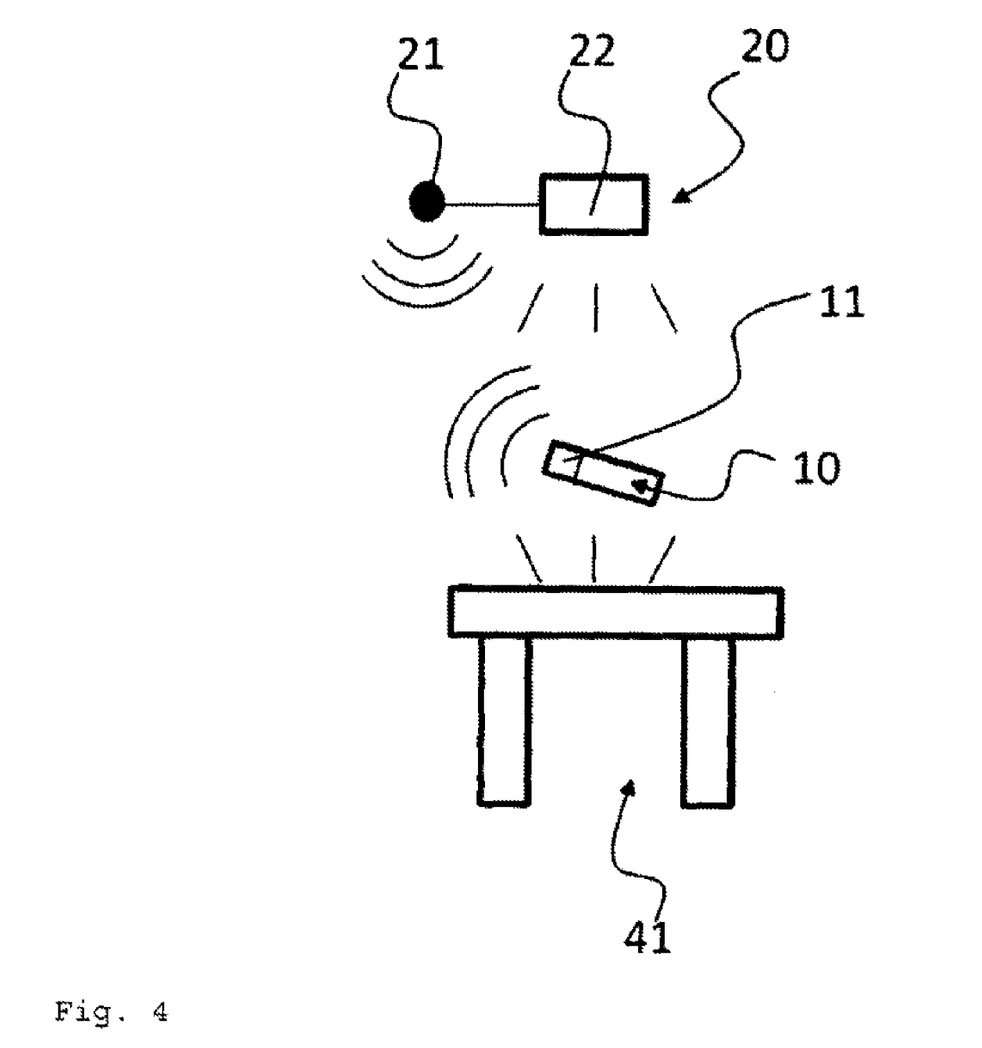
FIG. 4 shows an exemplary measuring arrangement.

FIG. 4 shows an exemplary arrangement of the mobile device 10 for detecting technical lighting parameters. In this case, the device 10 picks up light from a lighting means 22, for example via the camera 1 (as first optical sensor 12) or the light sensor 2 (as second optical sensor 13), and at the same time light reflected from a desk 41, for example via the camera 3. The communication between an interface 11 of the mobile device 10 and an interface 21 of an operating device 20 for the operation of the lighting means 22 is likewise shown schematically. The mobile device 10 can also detect the ambient light; by way of example, the ambient light can be inferred as a result of an interim change of the brightness or preferably brief switching-off of the lighting means 22.

Figure 5:
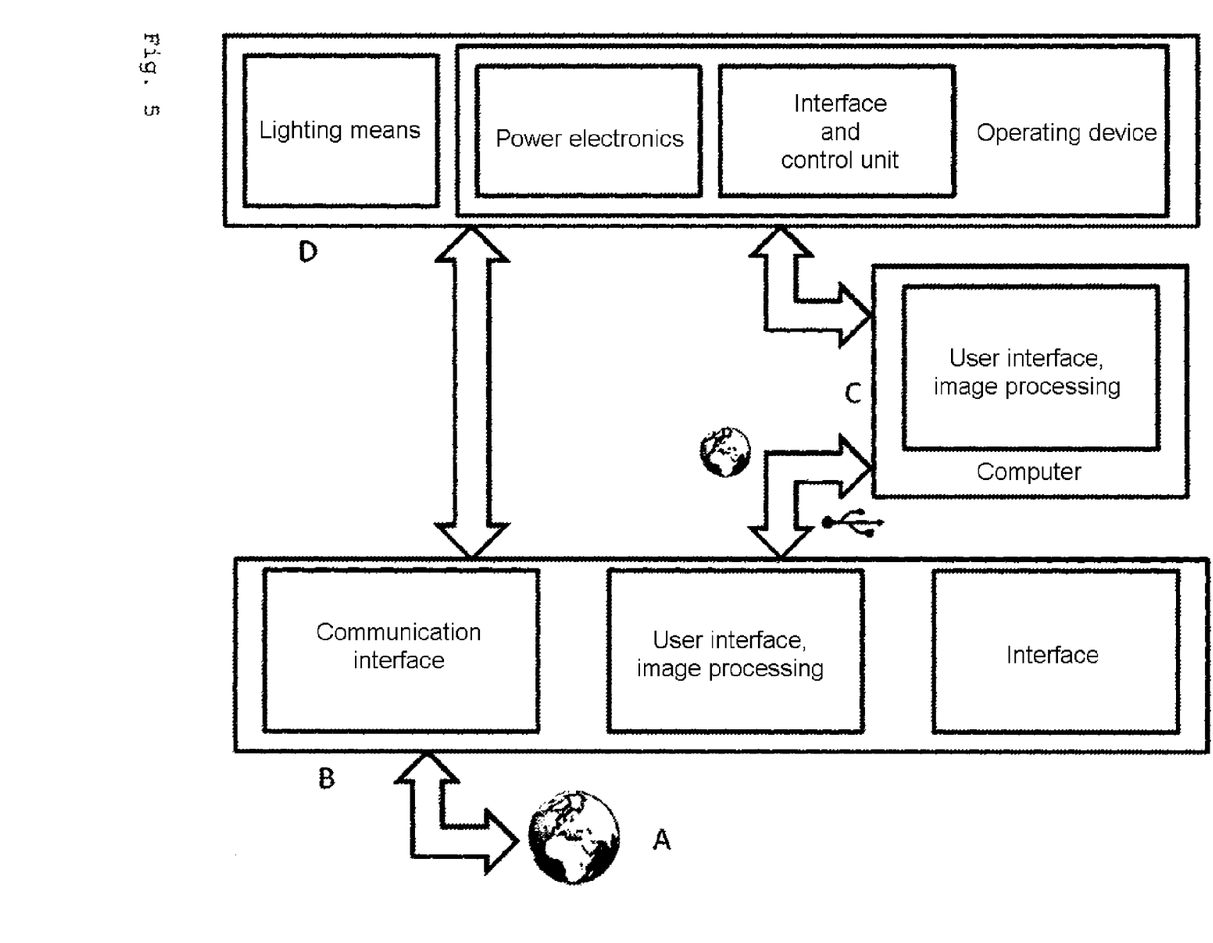
FIG. 5 schematically shows one embodiment of the overall system.

FIG. 5 schematically shows the method according to the invention. A luminaire D emits a luminous flux that is detected by means of the mobile device B.

The luminous flux can be detected and evaluated by the at least one optical sensor. The mobile device B can either directly control the luminaire, or an operating device present therein, by altering configuration parameters or can firstly transmit configuration parameters to a computer, e.g. a PC, from which the configuration parameters are then transmitted to the luminaire D.

By means of a network connection of the mobile device B, relevant data, e.g. the configuration parameters, can additionally be internet worked and other data, such as e.g. an ambient temperature or the season, can be taken into account in the configuration.

In the case where a plurality of optical sensors are present, for example in the case of two cameras 1, 3, the simultaneous detection of a plurality of technical lighting parameters is possible, e.g. the detection of luminous flux parameters, the detection of properties of an object as object parameters, e.g. concerning an object surface property, and/or the detection of bearing surface parameters.

In summary, the advantages of the invention can be characterized as follows: the mobile device 10 detects at least one technical lighting parameter (e.g. an irradiance, a color temperature, a color, . . . ) directly at the desired location and regulates/controls the lighting means 22 for example by means of a saved algorithm by the alteration of the configuration parameters in the operating device. As a result, fault sources, e.g. disturbance sources which result from a constitution or color of an object, but also upstream or hidden luminaire glasses, for example, can be taken into account in the configuration of the operating device.

Via a network link, e.g. via an Internet link of the mobile device, these data can be exchanged and taken into account and used in the configuration.

By way of example, an external temperature can be determined and a color mixing can automatically be changed by means of a configuration parameter alteration in order to generate a different light. Another example is the alteration of the proportion of blue in the light emitted by the lighting means 22. The proportion of blue can be altered depending on the season, for example, in order to bring about a more pleasant light impression, for example.

Finally, the energy efficiency can be increased since, for example, the light emission can be adapted to surface features, for example black or dark or white or light desk surfaces, by the alteration of the configuration parameters.

The start-up of luminaires and/or operating devices is likewise simplified since a position can be determined by the localizing unit in the mobile device 10, which position can then be communicated to the operating device 20. In this case, the altimeter can be used for story detection, while GPS, compass and acceleration sensor and also the optical sensor can be evaluated for the position detection.

Moreover, proceeding from a reference point and a determination of a relative position with respect thereto, it is possible to determine the position of the mobile device and thus also the position of the luminaire and/or of the corresponding operating device. A wireless communication interface of the mobile device, for example a GSM module or a WLAN module, can also support the position finding by the determination of transmission mast positions (as fixed reference points) and/or propagation time measurements. Such position finding can be effected for example with the aid of a central unit, where for example software with real-time suitability runs on a central computer and carries out position finding on the basis of the communicated propagation time measurements and information concerning distance and direction with respect to the fixed reference points. The position determined can be communicated to the mobile device 10 and/or operating device by the central unit.

The position finding can additionally or alternatively also be carried out on the basis of the evaluation of images recorded by means of the camera 1 (as first optical sensor 12). In this case, the camera 1 can be used to record an image of the luminaire to be identified with the operating device 20 and the lighting means 22, the luminaire and the surroundings thereof being recorded on said image. This recorded image can be used for position finding on the basis of a comparison with reference images, for example by identification of significant points at the luminaire or the surroundings or else by means of an identification code (can be a bar code, for example) applied on the luminaire, for example. Such an evaluation of the images can be effected for example on the mobile device 10 (in particular by means of the image processing 18) or else on a central unit (a computer), in this case the images and the results of the evaluation being transmitted via the communication interface 19.

Configuration parameters and position parameters can also be stored in the mobile device 10 and can be communicated to a central unit only upon connection to some other computer, or when the mobile device is connected to an operating device bus. The present invention can also be used to include natural ambient light in the configuration of the lighting means, or to activate and/or deactivate lighting means depending on the position of the mobile device.

The invention claimed is:

1. A mobile device (10) for configuring at least one operating device (20) for operating a lighting means (22), said mobile device (10) comprising at least one optical sensor (12, 13) provided for detecting technical lighting parameters, by way of device-internal image processing (18), and/or
at least one localizing unit (110) provided for detecting absolute and/or relative position parameters of the mobile device (10), and an interface (11) for communication with the at least one operating device (20) configured to exchange configuration parameters with the operating device (20) and, on the basis of the detected technical lighting parameters and/or position parameters, to alter at least one configuration parameter that influences the light rendering of the lighting means (22) in the operating device (20), wherein the mobile device (10) is configured automatically to identify the operating device (20) by means of an identifier and to communicate predetermined configuration parameters to the operating device (20) and wherein the mobile device (10) is configured to read out and store position data from the operating device (20) and/or a luminaire, and wherein the mobile device (10) is further configured to communicate predetermined configuration parameters to the operating device (20) automatically and/or in response to a user interaction, if the mobile device (10) is situated at a specific distance from the operating device (20).

2. The mobile device (10) as claimed in claim 1, wherein the at least one optical sensor (12, 13) is a light sensor (3), an image sensor and/or a camera (1), and wherein the optical sensor (12, 13) is configured to determine at least one technical lighting parameter selected from the group consisting of: brightness information, an irradiance of an object, a surface property of an object, a color temperature, a color and light temperature.

3. The mobile device (10) as claimed in claim 1, wherein the at least one localizing unit (110) has an altimeter, a GPS receiver and/or a compass and/or the mobile device (10) is configured to receive radio signals and/or light signals.

4. The mobile device (10) as claimed in claim 1, wherein the mobile device (10) is configured to read out and store at least one configuration parameter from the operating device (20).

5. The mobile device (10) as claimed in claim 1, wherein the interface (11) is configured for wireless and/or wired communication.

6. The mobile device (10) as claimed in claim 1, wherein the mobile device (10) is a mobile communication terminal.

7. The mobile device (10) as claimed in claim 1, wherein the mobile device (10) further comprises a user interface (14), which is provided for altering configuration parameters, depending on the detected technical lighting parameters and/or the position parameters, in response to a user interaction, and wherein the mobile device (10) is configured to transmit the altered configuration parameters to the operating device (20) or the lighting means.

8. The mobile device (10) as claimed in claim 1, wherein the mobile device (10) is configured to determine a position from the position parameters and to communicate the position to the operating device (20).

9. A mobile device (10) for configuring at least one operating device (20) for operating a lighting means (22), said mobile device (10) comprising at least one optical sensor (12, 13) provided for detecting technical lighting parameters, by way of device-internal image processing (18), and/or
at least one localizing unit (110) provided for detecting absolute and/or relative position parameters of the mobile device (10), and
an interface (11) for communication with the at least one operating device (20) configured to exchange configuration parameters with the operating device (20) and, on the basis of the detected technical lighting parameters and/or position parameters, to alter at least one configuration parameter that influences the light rendering of the lighting means (22) in the operating device (20) wherein the mobile device (10) is configured to select, automatically and/or in response to a user interaction, a configuration parameter set for the operation of the lighting means (22) from at least one configuration parameter set having at least one configuration parameter which is saved in the operating device (20) and/or is stored in the operating device (20) or a luminaire, and wherein the mobile device (10) is configured to indicate the at least one configuration parameter set saved in the operating device (20) and/or stored in the operating device (20), in accordance with a sorting, according to a frequency of the choice of the at least one configuration parameter set.

10. A method for the configuration of an operating device (20) for operating a lighting means, said method comprising:
providing a mobile device (10), having at least one optical sensor (12, 13),
detecting, using the at least one optical sensor (12, 13), technical lighting parameters, and/or detecting absolute and/or relative position parameters of the mobile device (10) by at least one localizing unit (110), and wherein
the mobile device (10) and the operating device (20) exchange configuration parameters via a respective interface (11, 21), wherein the mobile device (10), via the interface (11), on the basis of the detected technical lighting parameters and/or position parameters, alters at least one configuration parameter that influences the light rendering of the lighting means (22) in the operating device (20).

11. A mobile device (10) for configuring at least one operating device (20) for operating a lighting means (22), said mobile device (10) comprising at least one optical sensor (12, 13) provided for detecting technical lighting parameters, by way of device-internal image processing (18), and/or
at least one localizing unit (110) provided for detecting absolute and/or relative position parameters of the mobile device (10), and
an interface (11) for communication with the at least one operating device (20) configured to exchange configuration parameters with the operating device (20) and, on the basis of the detected technical lighting parameters and/or position parameters, to alter at least one configuration parameter that influences the light rendering of the lighting means (22) in the operating device (20), wherein the mobile device (10) comprises a communication interface and is configured to receive temperature and/or time information, from an external memory (50) via the communication interface (19) and thereupon, automatically and/or in response to a user interaction, to communicate configuration parameters via the interface (11) for communication with the operating device (20), and wherein the mobile device (10) is configured to transmit configuration parameters and/or a configuration parameter set to the external memory (50) via the communication interface (19).

12. The mobile device (10) as claimed in claim 11, wherein the mobile device (10) is configured to receive data for representing the user interface (14) and/or parts thereof, data for carrying out the image processing (18), at least one operating device/luminaire identifier and/or position data for at least one operating device (20) via the communication interface (19).

13. An operating device (20) for operating a lighting means, wherein
the operating device (20) comprises an interface (21) for communication with at least one mobile device (10), the at least one mobile device (10) comprising at least one optical sensor (12, 13) provided for detecting technical lighting parameters, by way of device-internal image processing (18), and/or
at least one localizing unit (110) provided for detecting absolute and/or relative position parameters of the mobile device (10), and
an interface (11) for communication with the at least one operating device (20) configured to exchange configuration parameters with the operating device (20) and, on the basis of the detected technical lighting parameters and/or position parameters, to alter at least one configuration parameter that influences the light rendering of the lighting means (22) in the operating device (20), and wherein the operating device (20) is configured, via the interface (21), to exchange configuration parameters with the mobile device (10), to store a position communicated by the mobile device (10) and/or at least one configuration parameter communicated by the mobile device (10), and to alter at least one configuration parameter that influences the light rendering of the lighting means (22) depending on the at least one communicated configuration parameter.

14. A luminaire comprising an operating device (20) as claimed in claim 13.

15. The operating device (20) as claimed in claim 13, wherein the operating device (20) is configured to store a configuration parameter set having at least one configuration parameter and/or to communicate at least one configuration identifier for the configuration parameter set to the mobile device (10).

16. The operating device (20) as claimed in claim 13, wherein the operating device (20) is configured to determine its position on the basis of received radio and/or light signals and to communicate the position to the mobile device (10).

17. A configuration system comprising
at least one operating device (20) for operating a lighting means (22) and/or a luminaire, and
at least one mobile device (10) for the configuration of the at least one operating device (20) and/or the luminaire, wherein
the mobile device (10) comprises at least one optical sensor (12, 13) provided for detecting technical lighting parameters, by way of device-internal image processing (18), and/or at least one localizing unit (110) provided for detecting absolute and/or relative position parameters of the mobile device (10), wherein
the operating device (20) and the mobile device (10) in each case comprise an interface (21, 11) configured in each case to exchange configuration parameters between the operating device (20) and the mobile device (10), and wherein the mobile device (10) is configured, via the interface (11), on the basis of the detected technical lighting parameters and/or position parameters, to alter at least one configuration parameter that influences the light rendering of the lighting means in the operating device (20).

18. The system as claimed in claim 17, wherein the mobile device (10) comprises at least one optical sensor (12, 13) provided for detecting technical lighting parameters, by way of device-internal image processing (18), and/or
at least one localizing unit (110) provided for detecting absolute and/or relative position parameters of the mobile device (10), and wherein
the mobile device (10) comprises an interface (11) for communication with the at least one operating device (20), and is configured, via the interface (11), to exchange configuration parameters with the operating device (20) and, on the basis of the detected technical lighting parameters and/or position parameters, to alter at least one configuration parameter that influences the light rendering of the lighting means (22) in the operating device (20), and wherein the operating device (20) for operating the lighting means is an operating device (20) comprising an interface (21) for communication with the at least one mobile device (10), and wherein the operating device (20) is configured, via the interface (21), to exchange configuration parameters with the mobile device (10), to store a position communicated by the mobile device (10) and/or at least one configuration parameter communicated by the mobile device (10), and to alter at least one configuration parameter that influences the light rendering of the lighting means (22) depending on the at least one communicated configuration parameter.

* * * * *